United States Patent
Hayes, Jr.

(10) Patent No.: US 7,340,817 B2
(45) Date of Patent: Mar. 11, 2008

(54) MOLDED FLARE ASSEMBLY

(76) Inventor: Frank F. Hayes, Jr., 1712-M Newport Cir., Santa Ana, CA (US) 92705

( * ) Notice: Subject to any disclaimer, the term of this patent is extended or adjusted under 35 U.S.C. 154(b) by 0 days.

(21) Appl. No.: 11/358,487

(22) Filed: Feb. 20, 2006

(65) Prior Publication Data

US 2006/0150409 A1     Jul. 13, 2006

(51) Int. Cl.
*B23P 11/02*       (2006.01)
(52) U.S. Cl. ............................. 29/525; 285/415; 29/237
(58) Field of Classification Search ................ 285/179, 285/387, 388, 354, 414, 415; 138/DIG. 9, 138/DIG. 3, DIG. 7; 29/525, 237
See application file for complete search history.

(56) References Cited

U.S. PATENT DOCUMENTS

| | | | |
|---|---|---|---|
| 1,201,022 A | 10/1916 | Conniff | |
| 1,450,606 A | 4/1923 | Paine | |
| 2,137,137 A | 11/1938 | Goldacker | |
| 2,785,910 A | 3/1957 | Munger | |
| 3,028,630 A | 4/1962 | Walker | |
| 3,540,223 A | 11/1970 | Ebbe | |
| 3,746,493 A | 7/1973 | Stalter | |
| 3,930,777 A | 1/1976 | Ramsey | |
| 3,977,708 A * | 8/1976 | Jopp | 285/342 |
| 4,050,667 A | 9/1977 | Kossett | |
| 4,348,040 A | 9/1982 | Harjar | |
| 4,613,161 A | 9/1986 | Brisco | |
| 4,753,413 A | 6/1988 | Haigh | |
| 4,765,938 A | 8/1988 | Schmidt et al. | |
| 4,796,926 A | 1/1989 | Rapsilver | |
| 4,810,010 A | 3/1989 | Jones | |
| 4,907,830 A | 3/1990 | Sasa et al. | |
| 5,074,599 A * | 12/1991 | Wirbel et al. | 285/93 |
| 5,217,761 A | 6/1993 | Okada et al. | |
| 5,225,215 A | 7/1993 | Syvrud | |
| 5,248,172 A | 9/1993 | Wilson | |
| 5,516,159 A * | 5/1996 | Hirakawa et al. | 285/388 |
| 5,605,358 A | 2/1997 | Mohlenkamp | |
| 5,863,590 A * | 1/1999 | Alan et al. | 426/634 |
| 5,882,042 A | 3/1999 | Lacoste | |
| 6,086,113 A | 7/2000 | Bartholomew | |
| 6,164,706 A | 12/2000 | Hayes, Jr. | |
| 6,460,901 B2 | 10/2002 | Rochelle | |

* cited by examiner

*Primary Examiner*—David P. Bryant
*Assistant Examiner*—Christopher M Koehler
(74) *Attorney, Agent, or Firm*—Larry K. Roberts

(57) ABSTRACT

A fully formed flared portion is molded as part of the main body of the one embodiment of the fitting. The flared portion is inserted through the back side of a retaining cap. A collet assembly is assembled together around the smallest diameter of the tube fitting below the flare. The collet assembly is fitted into the top of a mating nut. The retaining cap is then snapped onto the top of the nut, completing the assembly.

9 Claims, 4 Drawing Sheets

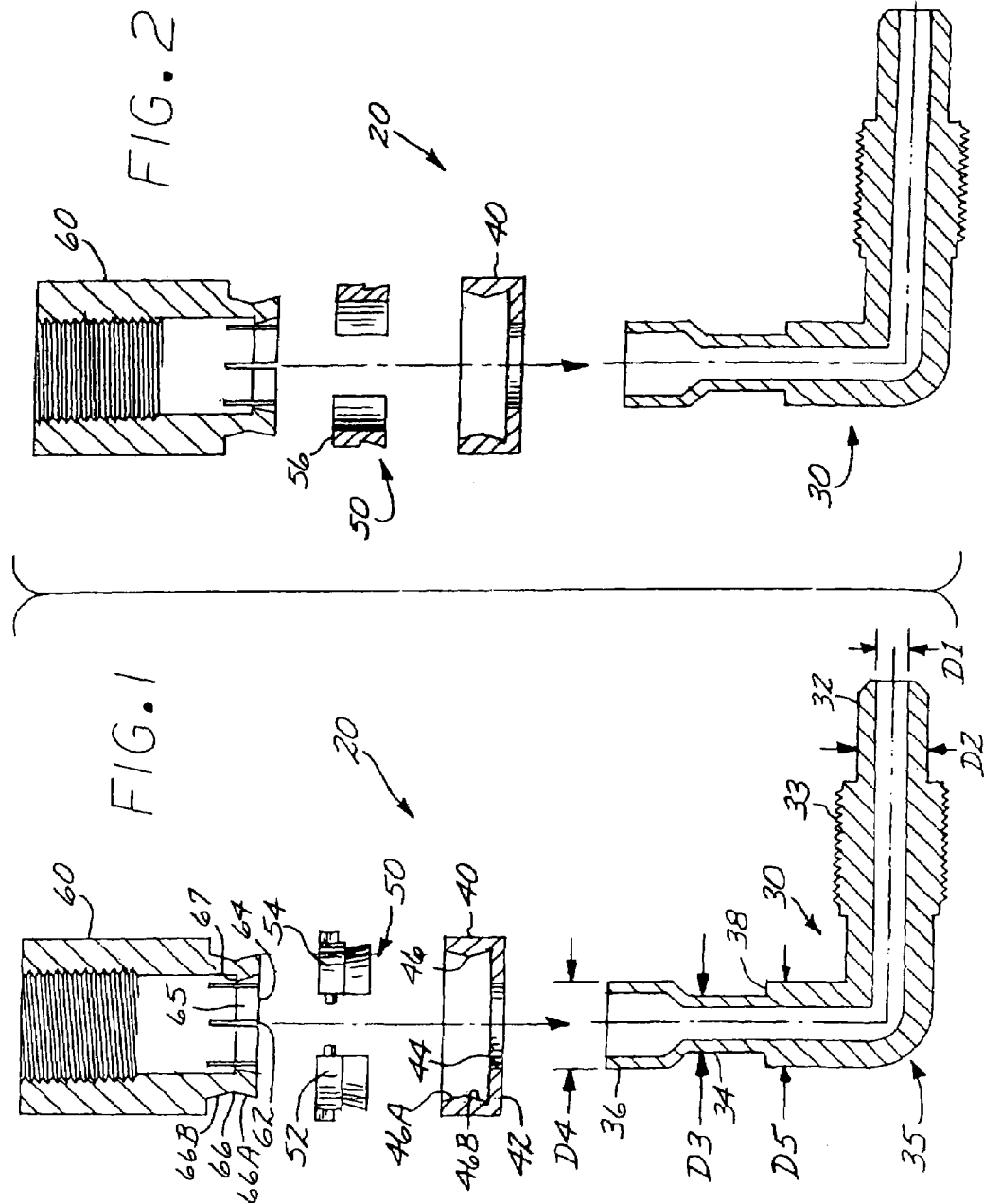

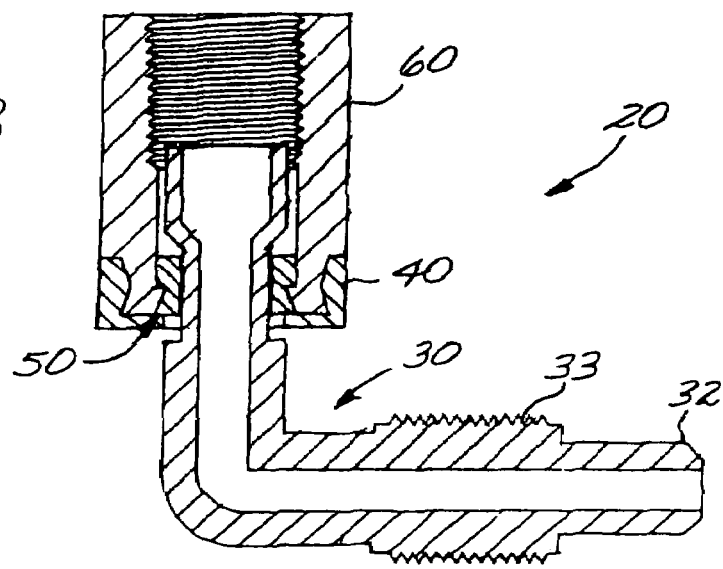
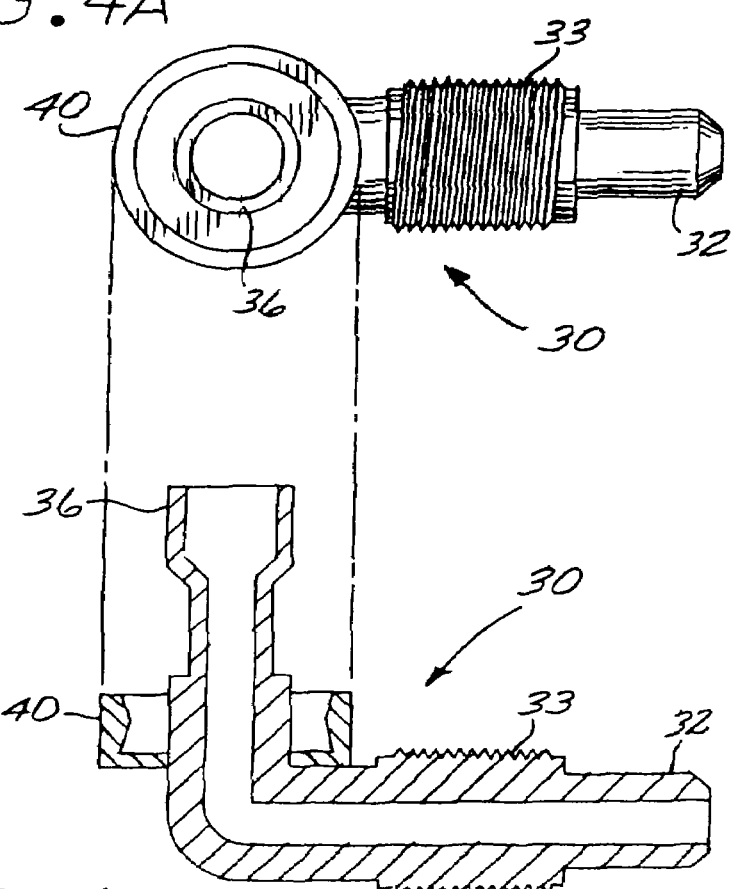

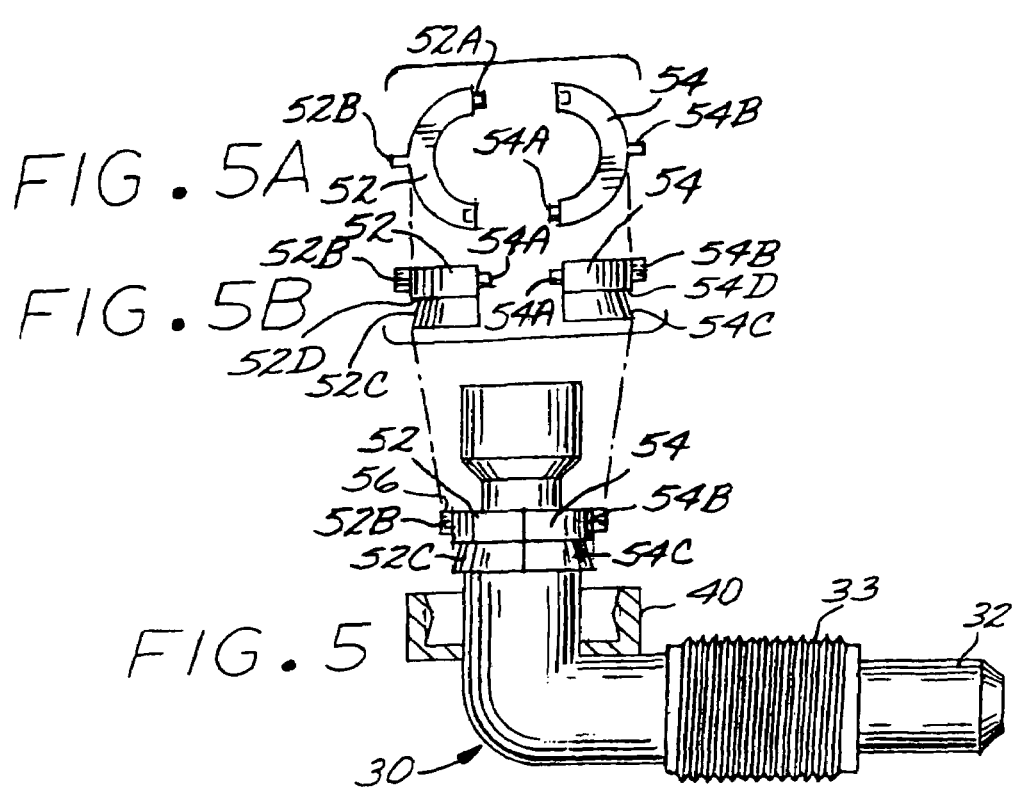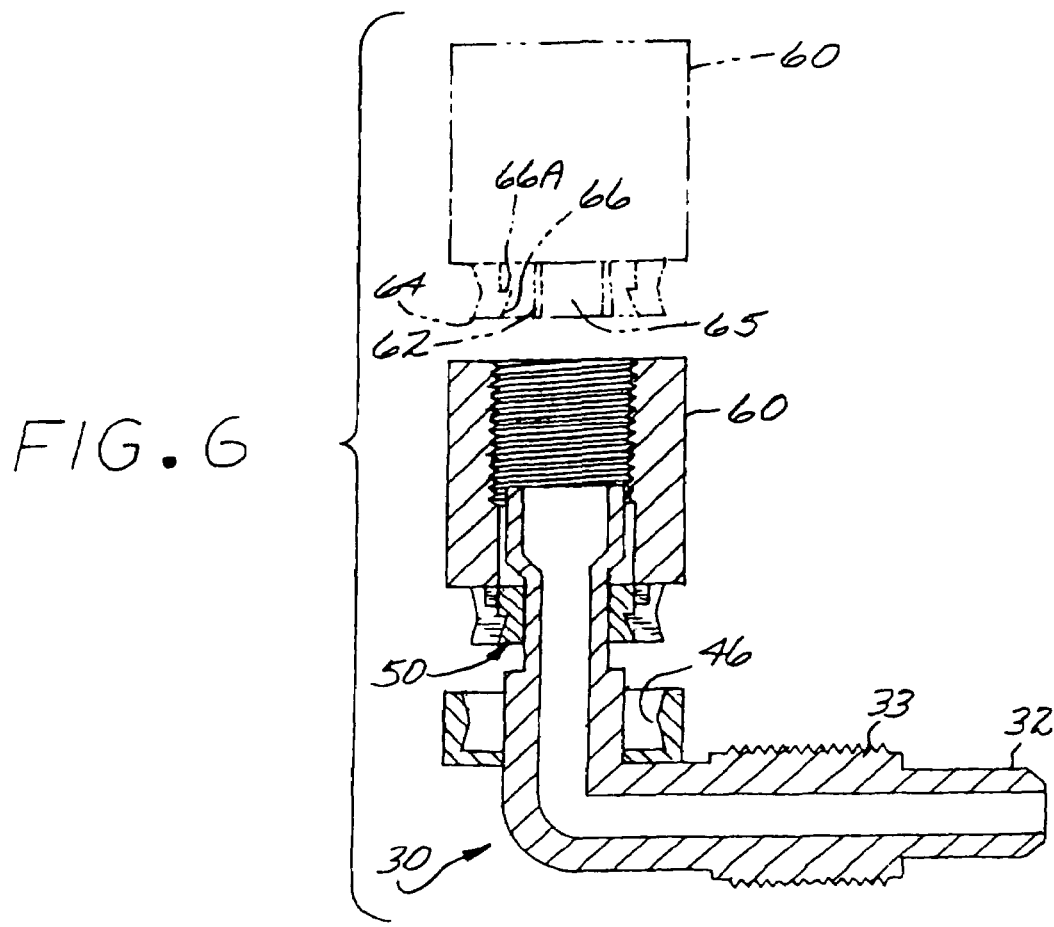

MOLDED FLARE ASSEMBLY

CROSS-REFERENCE TO RELATED APPLICATION

This application claims priority from provisional application 60/305,002, filed Jul. 12, 2001, the entire disclosure of which is incorporated herein by this reference, and from application Ser. No. 10/193,362, filed Jul. 11, 2002 the entire disclosure of which is incorporated herein by this reference.

BACKGROUND OF THE DISCLOSURE

A typical type of flared plastic fitting used for fluid flow applications has a flared tube end with a mating nut positioned inboard of the flared end to couple to a corresponding flared fitting. Conventional plastic flared fittings, such as a right angle fitting, are fabricated by molding a straight tube extension as part of the main body of the fitting. The tube extension is heated to a softened state, which can typically take two to three minutes. The tube extension is then inserted through the back side of the mating nut, pushed onto a forming mandrel and allowed to cool. After cooling, which may take on the order of five minutes to as much as ten to twelve minutes for some processes, the mandrel is removed from the now formed flared end.

This technique for forming a flared fitting has several disadvantages. Hot flaring molded fittings is a time consuming and inefficient process, requiring skilled technicians with special tools and equipment. Even so, the process has a typical reject rate on the order of 10% to 30%. Another disadvantage is that hand forming the flare results in lack of precision in the finished part. The trueness of the flared end with respect to the nominal tube fitting axis suffers due to the hand forming. The resulting parts are low tolerance, and this can result in a buildup of tolerances when many fittings are employed in an installation.

The hot flaring technique has also been implemented in semi-automated and automated systems, yet parts fabricated using semi-automated or fully automated systems have been found to have problems of lack of trueness and low tolerances.

It would be advantageous to provide a flare fitting with higher tolerance than afforded by known techniques.

It would also be advantageous to provide a technique for forming flared fittings resulting in higher throughput and which requires less skill than known hand forming techniques.

SUMMARY OF THE DISCLOSURE

In an exemplary technique in accordance with an aspect of this invention, a fully formed flare is molded as part of the main body of the fitting. The flared portion is inserted through the back side of a retaining cap. A collet assembly is assembled together around the smallest diameter of the tube fitting below the flare. The collet assembly is fitted into the top of the mating nut. The retaining cap is then snapped onto the top of the nut, completing the assembly.

Fully molded flared fitting bodies are molded in a finished state, providing dimensions that are accurate and repeatable. Assembly is simple.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 is an exploded cross-sectional view of a molded flared right angle fitting in accordance with aspects of the invention.

FIG. 2 is a view similar to FIG. 1, but showing the collet pieces assembled into a collet assembly.

FIG. 3 is a cross-sectional view of the fully assembled flared fitting.

FIGS. 4-6 illustrate the flared fitting of FIGS. 1-3 in various stages of assembly.

FIG. 4 is a longitudinal cross-sectional view of the fitting with the collet pieces assembled into a collet assembly, without the threaded nut. FIG. 4A is a top view of the fitting as shown in FIG. 4.

FIG. 5 is a side view of the fitting of the fitting with the collet pieces assembled into a collet assembly, showing how the collet pieces are fitted together to form the collet assembly. FIG. 5A is a top view of the collet pieces in exploded view. FIG. 5B is a side view of the collet pieces in exploded view.

FIG. 6 is a cross-sectional view of the flared fitting with the nut shown positioned for assembly in phantom, and in assembled form.

DETAILED DESCRIPTION OF THE DISCLOSURE

Figure 7:
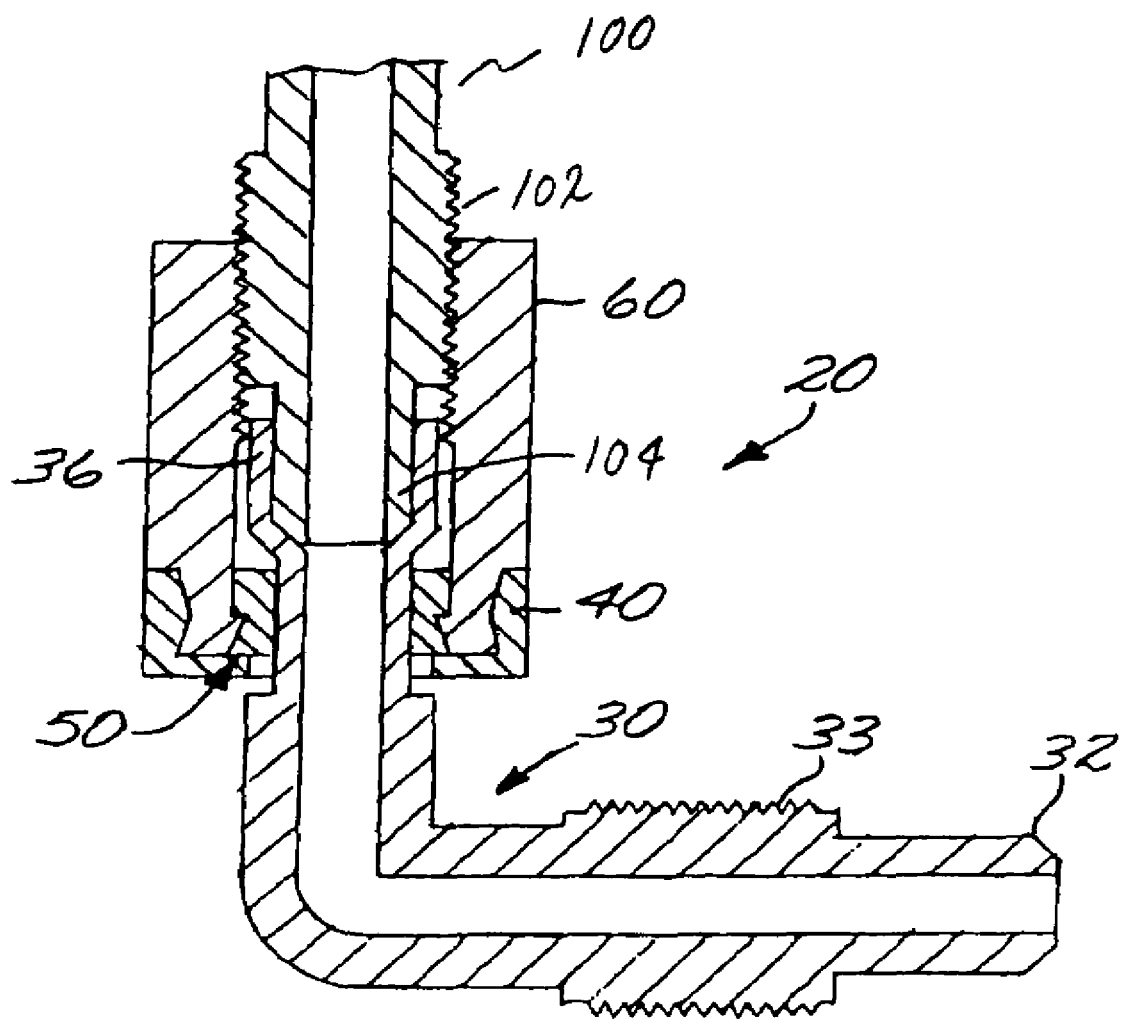
FIG. 7 illustrates the flared fitting engaged with a mating connector.

FIGS. 1-6 illustrate an exemplary embodiment of a right angle flared fitting 20 in accordance with aspects of the invention. The fitting 20 is a right angle fitting comprising a fully molded flare body 20, injection molded from a material such as perfluoroalkoxy (PFA), or other melt-processable fluoropolymers or melt-processable polymers such as polypropylene. The body part 30 is fully formed in the molding process, wherein a male end 32 is formed having an inner diameter D1 and an outer diameter D2, and a threaded outer peripheral portion 33. A right angle is defined between the male end and the flared female end 36. End 36 has an outer diameter D3 at portion 34, and is flared to form female flared end 36 having a maximum outer diameter D4. Portion 34 has a smaller outer diameter D3 than dimension D4 or dimension D5 at the right angle portion 35, thus defining a shoulder 38 on the molded body part 30.

The fitting 20 further includes a retaining cap 40, a collet assembly formed of a plurality of collet pieces, in this example two collet pieces 52, 54 (FIG. 2), and an expandable nut 60. These elements can be fabricated from a rigid plastic material such as polyvinylildene fluoride (PVDF), ethylene tetrafluoroethylene (ETFE), or for some applications, the same material as that of the body member 30, in this exemplary embodiment PFA. Each of these elements are typically injection molded, fully formed parts.

The nut 60 has a plurality of slightly tapered slots 62 formed in end 64, in this exemplary embodiment wherein the nut is fabricated of PVDF, six slots, each having a slot width of 0.028 inch at the end 64 and a width of 0.025 inch at the end distal from the nut end 64. As a result of the slots 62, the nut at end 64 is expandable. For other materials, such as PFA, the slots may be wider. The slots are formed wide enough to receive the locking tabs on the collet assembly. The external periphery of the nut adjacent the end 64 has a compound angle shape, with a circumferential line 66 of reduced diameter inward of the end. Surface 66A leads from the end 64 back to the line 66, and surface 66B leads from line 66 away from the end. The size of the angles defined by surfaces 66A and 66B will depend on the application and the materials used in fabrication of the parts. The interior surface of the nut at end 64 is beveled, to form a chamfer surface 65, to facilitate insertion of the collet assembly 50.

The retaining cap 40 has a back surface 42 and a central opening 44 formed therein of a diameter large enough to pass the flared end 36 of the body portion therethrough. The inner surface has a shape which is complimentary to the shape of the outer periphery of the nut 60 adjacent end 64. Thus, circumferential line 46 defines a reduced diameter equal to the diameter of line 66 on the nut 60, with angled cap surfaces 46A and 46B matching the angled nut surfaces 66A and 66B.

FIG. 3 shows the fitting 20 in fully assembled form. The female end 36 is adapted to connect to a compatible fitting having a male end similar to end 32, with the nut 60 engaging a threaded peripheral portion of the compatible fitting to draw the flared female end and the male end (not shown in FIG. 3) tightly together. The cap 40 is interference fitted over the end 64 of the nut, with the complimentary inner shape (defined by 46, 46A, 46B) of the cap engaging against the outer shape (defined by 66, 66A, 66B) of the nut.

FIGS. 4-6 illustrate an exemplary assembly technique in accordance with an aspect of the invention. After the body part 30 has been fabricated in a molding process such as injection molding, the flared portion 36 is inserted through opening 42 and the back side of the retaining cap 40. The cap 40 is positioned below the shoulder 38 of the body 30, as illustrated in FIG. 4.

Referring now to FIG. 5, the collet pieces 52, 54 are assembled together around the smallest diameter (D3) region 34 of the tube fitting below the flare 36 to form the collet assembly 50. Each collet piece has a pin (52A, 54A) which fits into a corresponding hole formed in the other piece. Each collet piece also has a locking tab (52B, 54B) which protrudes from an outer peripheral surface of the piece. The tabs 52B, 54B have a width sized to slide into a slot 62 in the nut 60; the tab width in this exemplary embodiment, wherein the collet pieces are fabricated of PVDF, is 0.020 inch. The tab width for an embodiment fabricated of PFA could be wider. The tabs and the slots in the nut will have roughly the same width; the slots are slightly wider to provide some clearance, say on the order of 0.004 inch in one exemplary embodiment. The foregoing dimensions are by way of example only; for particular applications wider or narrower slots and tabs could alternatively be employed. The tabs 52B, 54B are aligned with corresponding ones of the slots 62 in the locking nut, and the collet assembly is pushed into the end 64 of the nut. The slots 62 have a depth selected to allow the collet assembly to be fitted into the end 64 of the nut so that the collet assembly does not protrude from the nut end 64. The collet pieces 52, 54 have beveled surfaces 52C, 54C which abut shoulder surfaces 52D, 54D. The beveled surfaces 52C, 54C essentially match the chamfer surface 65 of the nut opening at end 64, and as the collet assembly is pressed into the end of nut 60, the nut end will expand slightly to allow the leading end 56 (FIG. 5) of the assembly 50 to enter the nut opening at end 64, with the chamfer surface 65 facilitating the insertion of the collet assembly. As the collet assembly is pressed upwardly into the end of the nut, beveled surfaces 52C, 54C will come into contact with the chamfer surface 65 of the nut, and the nut end can resume its normal diameter. The shoulder surfaces 52D, 54D of the collet assembly engage against the shoulder surface 67 of the nut, preventing the collet assembly from sliding out the end 64 of the nut. The tabs prevent the collet assembly from being pressed through the nut completely, stopped by the ends of the slots.

Next, again referring to FIG. 6, the retaining cap 40 is press fitted onto the end 64 of the nut 60. The cap 40 has a beveled interior surface at 46, and this surface provides an interference fit of the cap onto the nut, locking the cap in place. The fully assembly fitting 20 is illustrated in FIG. 3. The nut 60 assembled with the collet assembly 50 and cap 40 is rotatable about the flared end 36 of the body 30, to engage a threaded male portion of a mating connector end. FIG. 7 illustrates the fitting 20 engaged with a mating connector 100 having a male end 104 which is received withing the flared end 36 of the fitting 20. The threads of the nut 60 engage a threaded outer periphery 102 of the connector 100 to draw the male end tightly into the flared end and create a fluid tight connection.

The assembly fitting 20 has several advantages. One is that, because the body 30 including the flared portion 36 is fully molded, the body has relatively high precision. There is a much smaller dimensional variation in the flared portion, than in parts fabricated using a conventional hot flare technique. This can provide greater surface area engagement with mating parts, reducing risk of leakage and improved reliability of the connection with mating parts in an installation. Further, the fitting is easy to assemble, and there is little waste.

While the molded flare fitting has been illustrated with respect to a right angle fitting, the technique can be used on other types of flare fittings, such as sweep elbow fittings, T connectors and straight connectors. Exemplary fitting sizes include ¼ inch, ⅜ inch, ½ inch, ¾ inch, 1 inch and 1¼ sizes, where the dimensions are of the dimension D1 (FIG. 1). Other sizes can also be employed.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for assembling a molded flare assembly, comprising:
    injection molding a body structure having a fluid passageway formed therethrough and a fully formed flared portion at a first end, the body portion having a small diameter portion adjacent the flared portion;
    fitting a retainer cap structure over the flared portion and to the small diameter portion;
    fitting a collet structure onto the small diameter portion of the body structure such that the cap structure is inward of the flared portion and the collet structure;
    positioning an end of a mating nut structure having an opening formed therethrough adjacent the flared portion; and
    press fitting the nut structure and the collet structure together such that the collet structure is received within said nut end in a non-rotatable relationship with said nut structure, and wherein said nut structure, said collet structure and said retainer cap structure are rotatable about said body structure.

2. The method of claim 1, further comprising:
    press fitting the retainer cap over the end of the nut structure to retain the collet structure in said nut end.

3. The method of claim 1, wherein said main body structure is fabricated of a melt-processable fluoropolymer.

4. The method of claim 1, wherein said collet pieces are fabricated of a rigid plastic material.

5. The method of claim 4, wherein said rigid plastic material is polyvinylildene fluoride (PVDF), ethylene tetrafluoroethylene (ETFE), or perfluoroalkoxy (PFA).

6. The method of claim 3, wherein said collet pieces are fabricated of said melt-processable fluoropolymer.

7. The method of claim 6 wherein said melt-processable fluoropolymer is perfluoroalkoxy (PFA).

8. The method of claim 1, wherein said main body structure is fabricated of perfluoroalkoxy (PFA).

9. A method for assembling a molded flare assembly, comprising:

injection molding a body structure having a fluid passageway formed therethrough and a fully formed flared portion at a first end, the body portion having a small diameter portion adjacent the flared portion;

assembling a multi-piece collet structure onto the small diameter portion of the body structure, wherein the collet structure has a plurality of protruding tabs;

positioning an end of a mating nut structure having an opening formed therethrough adjacent the flared portion, the nut structure having a plurality of slots formed therein from said end to a slot depth to allow some expansion of the nut end;

aligning the collet tabs with corresponding slots in the nut structure; and press fitting the nut structure and the collet assembly together such that the collet assembly is received within said nut end and the collet tabs fit into the corresponding slots.

* * * * *